United States Patent
Ma et al.

(10) Patent No.: US 11,150,991 B2
(45) Date of Patent: Oct. 19, 2021

(54) DYNAMICALLY ADJUSTING REDUNDANCY LEVELS OF STORAGE STRIPES

(71) Applicant: EMC IP Holding Company LLC, Hopkinton, MA (US)

(72) Inventors: Charles Ma, Beijing (CN); Vamsi K. Vankamamidi, Hopkinton, MA (US); Hongpo Gao, Beijing (CN); Shaoqin Gong, Beijing (CN); Ree Lei Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 16/743,624

(22) Filed: Jan. 15, 2020

(65) Prior Publication Data

US 2021/0216403 A1    Jul. 15, 2021

(51) Int. Cl.
*G06F 11/10* (2006.01)

(52) U.S. Cl.
CPC .............................. *G06F 11/1096* (2013.01)

(58) Field of Classification Search
CPC .................................................. G06F 11/1096
See application file for complete search history.

(56) References Cited

U.S. PATENT DOCUMENTS

| 11,003,554 | B2 | 5/2021 | Shveidel et al. |
| 11,023,147 | B2 | 6/2021 | Shang et al. |
| 2007/0101188 | A1* | 5/2007 | Lin ...................... G06F 11/1092 714/6.12 |
| 2008/0162605 | A1* | 7/2008 | Tsuchiya ............. G06F 11/2069 |
| 2011/0238912 | A1* | 9/2011 | Shuster ................ G06F 3/0608 711/114 |
| 2016/0357648 | A1* | 12/2016 | Keremane ........... G06F 11/2058 |
| 2017/0109246 | A1* | 4/2017 | Chien ................. G06F 11/2069 |
| 2018/0357019 | A1* | 12/2018 | Karr ....................... G06F 3/061 |

* cited by examiner

*Primary Examiner* — Thien Nguyen
(74) *Attorney, Agent, or Firm* — BainwoodHuang

(57) ABSTRACT

A method of managing storage resources is provided. The method includes (a) storing data in an array of storage extents on respective storage drives of a plurality of storage drives, the array of storage extents having a first level of redundancy; and (b) in accordance with a storage management policy, adjusting the array of storage extents to have a second level of redundancy by changing the array of storage extents from having a first number of storage extents on respective storage drives to having a second number of storage extents on respective storage drives, the second level of redundancy providing a different tolerance for failure than the first level of redundancy. An apparatus, system, and computer program product for performing a similar method are also provided.

17 Claims, 3 Drawing Sheets

DYNAMICALLY ADJUSTING REDUNDANCY LEVELS OF STORAGE STRIPES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems store both user data and metadata. Portions of the metadata identify user data and describe where the user data is stored. Some systems store metadata separately from user data and apply different levels of redundancy to user data and metadata. For example, higher redundancy may be used for storing metadata than for storing user data, allowing metadata to be more protected than user data.

SUMMARY

Loss of metadata is generally a more serious problem than loss of user data, as small amounts of metadata often track large amounts of user data. Losing even a small amount of metadata can thus render a large amount of user data unrecoverable. Unfortunately, the redundancy applied when storing metadata can be less than ideal, as tradeoffs come into play when allocating storage space, and very high levels of metadata redundancy can be impractical.

Thus, it would be desirable to achieve higher levels of data protection for metadata without compromising storage space available for storing user data. This may be accomplished by dynamically adjusting levels of metadata redundancy to increase such levels as resource demands permit. For example, when available free storage exceeds a threshold, additional metadata redundancy may be provided. In some embodiments, in addition to checking available free storage to decide whether to increase metadata redundancy, availability of other system resources may also be considered, such as processing utilization, system memory utilization, and storage bus utilization, for example. When system resources drop, metadata redundancy may be restored back to baseline values. In some embodiments, these techniques may be used to vary levels of redundancy used to protect user data in addition to (or instead of) metadata.

In one embodiment, a method of managing storage resources is provided. The method includes (a) storing data in an array of storage extents on respective storage drives of a plurality of storage drives, the array of storage extents having a first level of redundancy; and (b) in accordance with a storage management policy, adjusting the array of storage extents to have a second level of redundancy by changing the array of storage extents from having a first number of storage extents on respective storage drives to having a second number of storage extents on respective storage drives, the second level of redundancy providing a different tolerance for failure than the first level of redundancy. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for achieving higher levels of data protection for metadata without compromising storage space available for storing user data. This result may be accomplished by dynamically adjusting levels of metadata redundancy to increase such levels as resource demands permit. For example, when available free storage exceeds a threshold, additional metadata redundancy may be provided. In some embodiments, in addition to checking available free storage to decide whether to increase metadata redundancy, availability of other system resources may also be considered, such as processing utilization, system memory utilization, and storage bus utilization, for example. When system resources drop, metadata redundancy may be restored back to baseline values. In some embodiments, these techniques may be used to vary levels of redundancy used to protect user data in addition to (or instead of) metadata.

Figure 1:
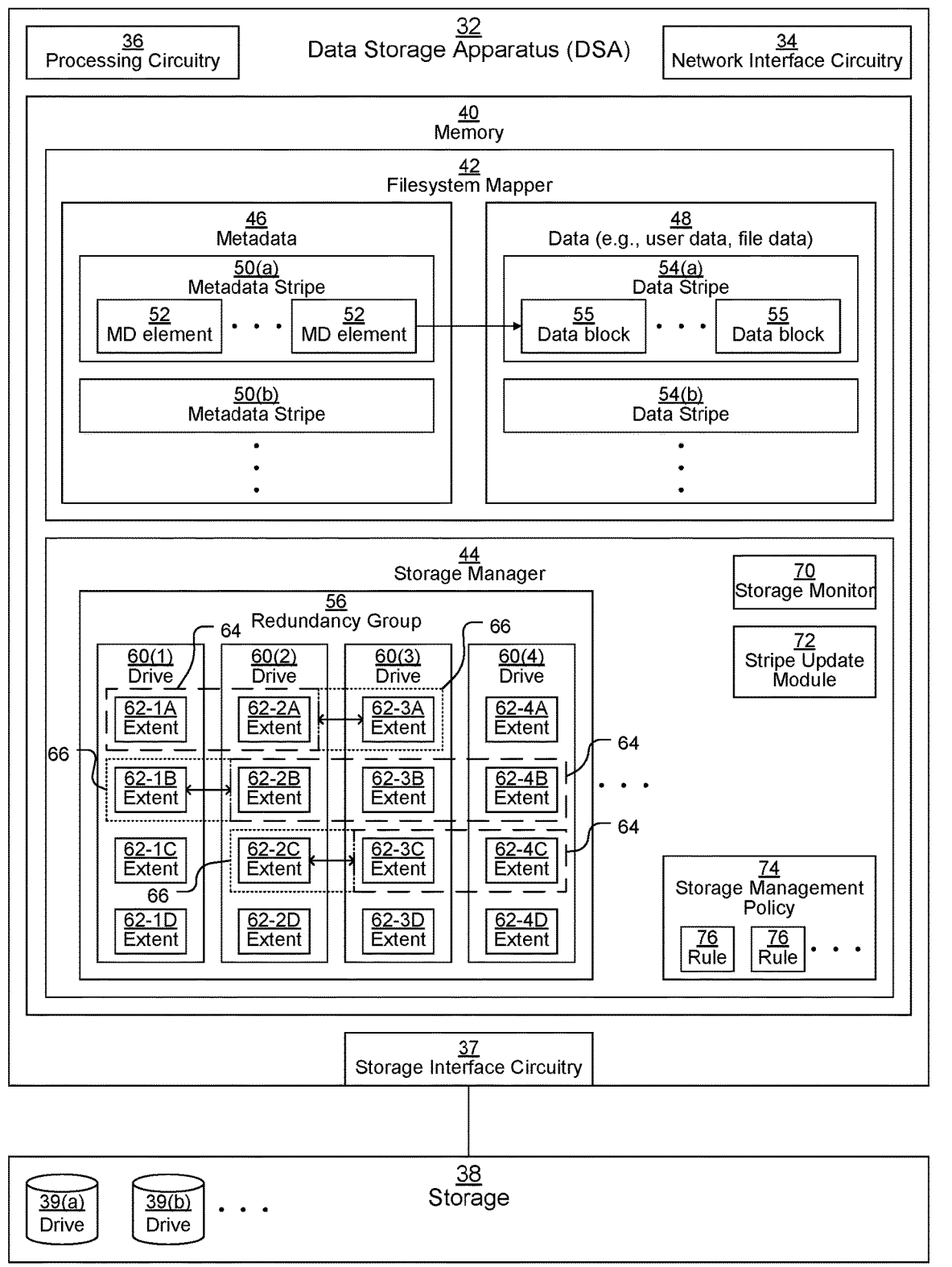
FIG. 1 is a block diagram depicting an example system, apparatus, and data structure arrangement for use in connection with various embodiments.

FIG. 1 depicts an example data storage environment (DSE) 30. DSE 30 may include one or more data storage apparatus (DSA) 32. Each DSA 32 may be any kind of computing device or collection (or cluster) of computing devices, such as, for example, a personal computer, workstation, server computer, enterprise server, data storage array device, laptop computer, tablet computer, smart phone, mobile computer, etc.

Each DSA 32 at least includes processing circuitry 36, storage interface circuitry 37, and memory 40. In some embodiments, a DSA 32 may also include network interface circuitry 34 as well as various other kinds of interfaces (not depicted). DSA 32 also includes interconnection circuitry.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as drives 39(*a*), 39(*b*), . . . ), such as, for example, hard disk drives, solid-state storage devices (SSDs), flash drives, NVMe drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows the DSA 32 to communicate with one or more host devices (not depicted) over the network.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a filesystem mapper 42, a storage manager 44, and other software modules (not depicted) which each execute on processing circuitry 36.

Filesystem mapper 42 manages one or more filesystems or other data structures (not depicted), keeping track of both data 48 and metadata 46. The data 48 may include user data, file data, etc. Metadata 46 describes and keeps track of the data 48, as is well-known in the art. Metadata (MD) elements 52 point to locations of various data blocks 55. The MD elements 52 are stored within MD stripes 50 (depicted as MD stripes 50(a), 50(b), . . . ), and the data blocks 55 are stored within data stripes 54 (depicted as data stripes 54(a), 54(b), . . . ). Each stripe 50, 54 is stored on a set of drives 39, striped across various extents 62 on those drives 39. In some embodiments, filesystem mapper 42 manages a log-structured storage system, which places data blocks 55 into data stripes 54(a) as the data blocks 55 are received for writing, keeping track of the logical placement of the various data blocks 55 within one or more filesystems using the MD elements 52, which are also placed into one or more MD stripes 50.

Storage manager 44 manages one or more redundancy groups 56. A redundancy group 56 is a logical grouping of drives 60 (each drive 60 logically representing a particular physical drive 39 of persistent storage 38) from which stripes 64, 66 are drawn and provided to the filesystem mapper 42 for use as MD stripes 50 or data stripes 54. Each drive 60 is logically divided into a set of extents 62. Typically, each extent 62 is a logically-contiguous set of storage locations within the underlying drive 39. Each extent 62 is typically the same size within any given redundancy group 56. In some embodiments, each extent 62 is 4 gigabytes, although this is by way of example only; in other embodiments, an extent 62 may larger or smaller. For example, an extent 62 may be as small as one sector (e.g., 512 bytes) or one block (e.g., 4 or 8 kilobytes). Although each drive 60 is depicted as having the same number of extents 62, this is by way of example only—different drives 60 may have different numbers of extents 62 therein.

Each redundancy group 56 may expose stripes 64 belonging to one or more pools. Thus, for example, a redundancy group 56 may expose some stripes 64 that are RAID-1 mirrors, other stripes 64 that are 4+1 RAID-5 groups, and yet other stripes 64 that are 9+1 RAID-5 groups, using principles of Mapped RAID (i.e., RAID implemented across extents 62 in a dynamic manner). Some of the types of stripes 64 may be expandable into enhanced stripes 66. Thus, for example, as depicted in FIG. 1, a 2-way mirrored stripe 64 made up of extents 62-1A and 62-2A may be enhanced to become a 3-way mirrored stripe 66 with the addition of stripe 62-3A. As another example, as depicted in FIG. 1, a 2+1 RAID-5 stripe 64 made up of extents 62-2B, 62-3B and 62-4B may be enhanced to become a 2+2 RAID-6 stripe 66 with the addition of stripe 62-1B. Various extents 62 (e.g., extents 62-3A, 62-4A, 62-1B, 62-1C, 62-2C, 62-1D, 62-2D, 62-3D, 62-4D in FIG. 1) may be spares that are not initially allocated to any stripe 64, although after the three depicted stripes 64 are enhanced into enhanced stripes 66, extents 62-3A, 62-1B, 62-2C have become parts of enhanced stripes 66 rather than spares.

Storage manager 44 may include a storage monitor module 70 and a stripe update module 72, which also execute on processing circuitry 36. Storage monitor 70 operates to monitor various aspects of the system status, such as, for example, collecting information about utilization, workload, and health of drives 39 and other system resource utilization (e.g., utilization of processing circuitry 36, memory 40, and storage interface circuitry 37). Stripe update module 72 operates to enhance stripes 64 into enhanced stripes 66 and to retrograde enhanced stripes 66 back into unenhanced stripes 64, based on the information collected by storage monitor 70 and a storage management policy 74. Storage management policy 74 may include a set of rules 76 that define when and how stripes 64, 66 are to be enhanced or retrograded.

Memory 40 may also store various other data structures used by the OS, filesystem mapper 42, storage manager 44, storage monitor 70, stripe update module 72, and various other applications.

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS, applications, filesystem mapper 42, storage manager 44, storage monitor 70, stripe update module 72, and storage management policy 74 are typically stored in this persistent storage portion of memory 40 or on persistent storage 38 so that they may be loaded into a system portion of memory 40 upon a system restart or as needed. The filesystem mapper 42, storage manager 44, storage monitor 70, and stripe update module 72, when stored in non-transitory form either in the volatile portion of memory 40 or on persistent storage 38 or in persistent portion of memory 40, each form a computer program product. The processing circuitry 36 running one or more applications thus forms a specialized circuit constructed and arranged to carry out the various processes described herein.

Figure 2:
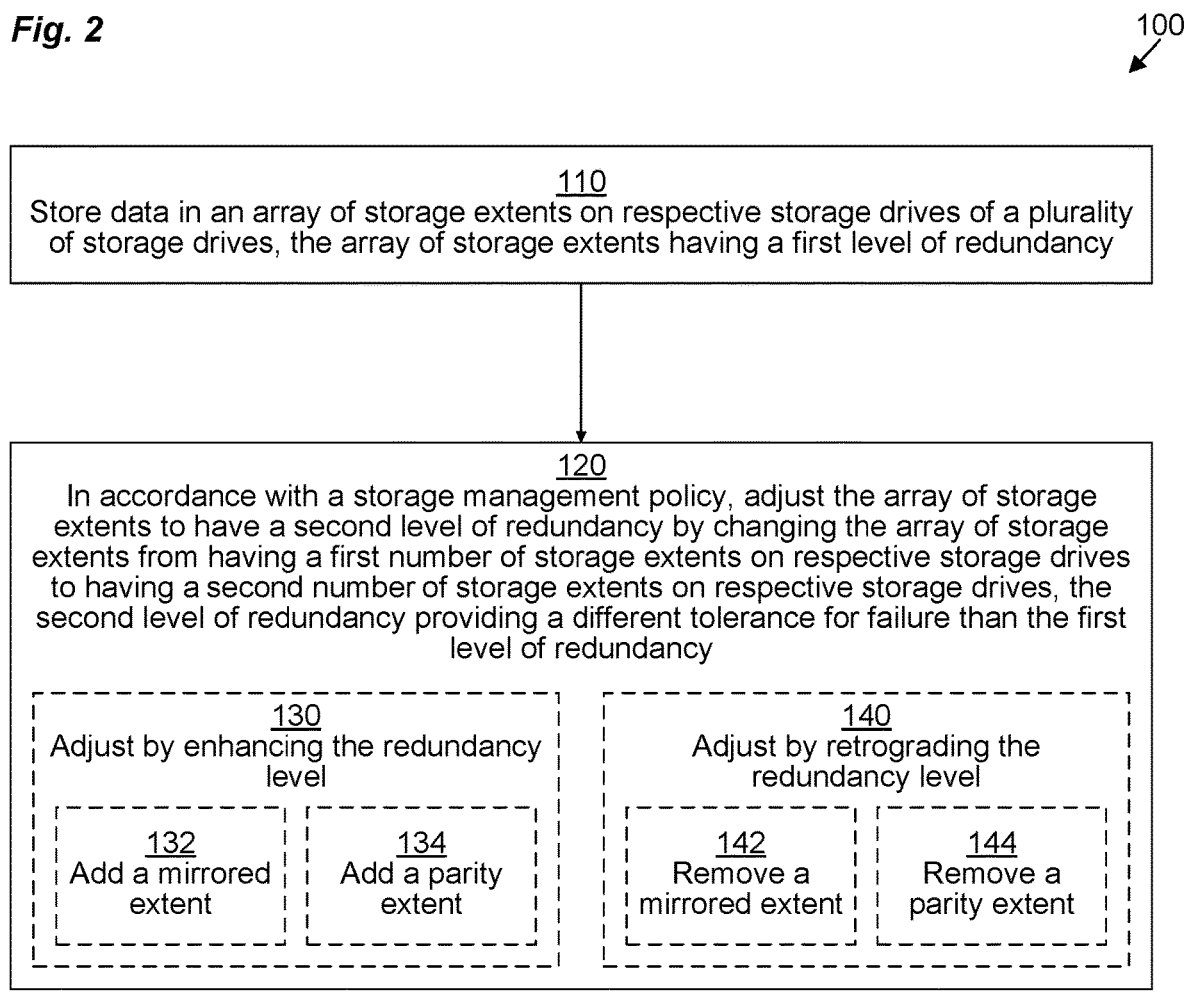
FIG. 2 is a flowchart depicting example methods of various embodiments.

FIG. 2 illustrates an example method 100 performed by DSA 32 for managing storage resources. It should be understood that any time a piece of software (e.g., filesystem mapper 42, storage manager 44, storage monitor 70, stripe update module 72) is described as performing a method, process, step, or function, what is meant is that a computing device (e.g., DSA 32) on which that piece of software is running performs the method, process, step, or function when executing that piece of software on its processing circuitry 36. It should be understood that one or more of the steps or sub-steps of method 100 may be omitted in some embodiments. For example, sub-steps 130, 132, 134, 140, 142, and 144 are depicted with dashed lines, indicating that they are either optional or representative of alternative embodiments. Similarly, in some embodiments, one or more steps or sub-steps may be combined together or performed in a different order.

In step 110, DSA 32 stores data in an array (e.g., a stripe 64, 66) of storage extents 62 on respective storage drives 60 of a plurality of storage drives 60 (e.g., the drives 60 making up redundancy group 56). The array (stripe 64, 66) of storage extents 62 has a first level of redundancy. In some embodiments, the first level of redundancy is two-way mirroring. In other embodiments, the first level of redundancy is three-way mirroring. In other embodiments, the first level of redundancy is striping with a single parity extent 62. In other embodiments, the first level of redundancy is striping with two or more parity extents 62. In some embodiments, the data that is stored is metadata 46 in a metadata stripe 50. In other embodiments, the data that is stored is data 48 in a data stripe 54. In some embodiments, the array of storage extents 62 is an unenhanced stripe 64. In other embodiments, the array of storage extents 62 is an enhanced stripe 66.

In step 120, in accordance with a storage management policy 74, stripe update module 72 adjusts the array (stripe 64, 66) of storage extents 62 to have a second level of redundancy different than the first level by changing the array of storage extents 62 from having a first number of storage extents 62 on respective drives 60 to having a second level of redundancy on a second number of storage extents on respective storage drives 60. The second level of redundancy provides a different tolerance for failure than the first level of redundancy.

In some embodiments, step 120 comprises sub-step 130, while in other embodiments, step 120 instead comprises sub-step 140. In sub-step 130, the redundancy level is enhanced, such as by adding an additional mirrored extent 62 to an unenhanced stripe 64 that was serving as an N-way mirror to form an enhanced stripe 66 acting as an (N+1)-way mirror (sub-step 132) or by adding an additional parity extent 62 to an unenhanced stripe 64 that initially had P parity extents 62 to form an enhanced stripe 66 that has P+1 parity extents 62 (sub-step 134).

In sub-step 140, the redundancy level is retrograded, such as by removing a mirrored extent 62 from an enhanced stripe 66 that was serving as an N-way mirror to form an unenhanced stripe 64 acting as an (N−1)-way mirror (sub-step 142) or by removing a parity extent 62 from an enhanced stripe 66 that initially had P parity extents 62 to form an unenhanced stripe 64 that has P−1 parity extents 62 (sub-step 144).

Figure 3:
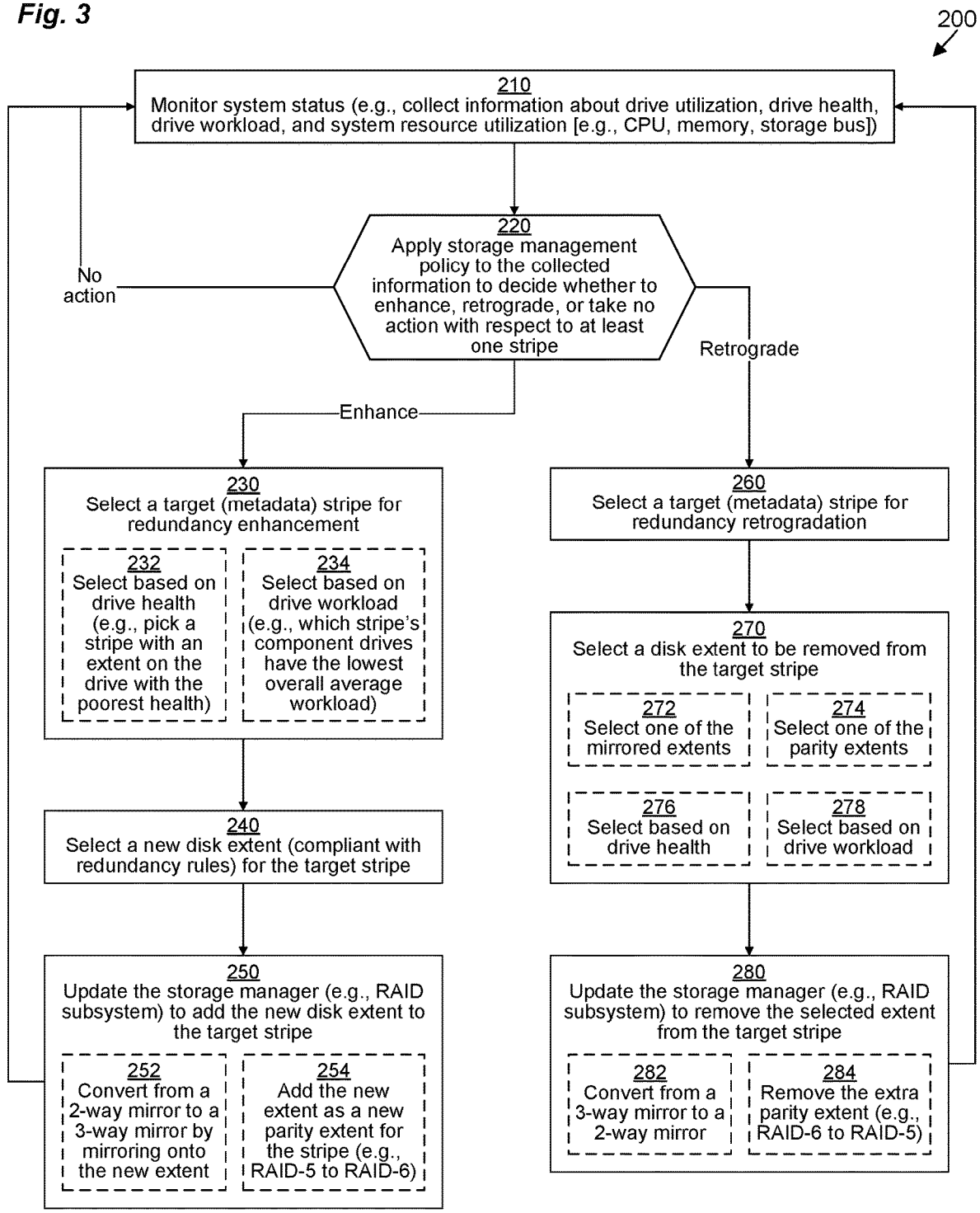
FIG. 3 is a flowchart depicting example methods of various embodiments.

FIG. 3 illustrates an example method 200 performed by DSA 32 for managing storage resources during operation of the DSA 32 to effect data storage. It should be understood that one or more of the steps or sub-steps of method 200 may be omitted in some embodiments. For example, sub-steps 232, 234, 252, 254, 272, 274, 276, 278, 282, and 284 are depicted with dashed lines, indicating that they are either optional or representative of alternative embodiments. Similarly, in some embodiments, one or more steps or sub-steps may be combined together or performed in a different order.

In step 210, storage monitor 70 monitors the system status. For example, storage monitor collects information about utilization of the various drives 39, health of the various drives 39, workload of the various drives 39, and system resource utilization (e.g., utilization of processing resources of the processing circuitry 36 and/or the storage interface circuitry 37, utilization of memory 40, and utilization of bus capacity of the storage interface circuitry 37). Drive health may be measured in various ways using techniques known in the art. For example, in some embodiments, it may be measured by recording a frequency of read errors and/or write errors.

In step 220, stripe update module 72 applies the storage management policy 74 to the collected information from step 210 to decide whether to enhance, retrograde, or take no action with respect to at least one stripe 64, 66 within a redundancy group 56. If no action is to be taken, the operation returns back to step 210 for more data collection. If enhancement is to be performed, operation proceeds with step 230, while if retrogradation is to be performed, operation proceeds with step 260.

In some embodiments, applying storage management policy 74 includes applying a rule 76 that requires that the available amount of storage space in a redundancy group 56 should be greater than a threshold minimum amount of space (threshold $T_1$) in order for enhancement to be triggered. In one embodiment, threshold $T_1$ is equal to the size of the largest drive 60 in the redundancy group 56. In another embodiment, the threshold $T_1$ is equal to the number of storage extents 62 in the largest drive 60 in the redundancy group 56. Thus, for example, suppose the largest drive 60 in the redundancy group 56 has 1,000 storage extents 62; the rule 76 will only be satisfied if there are at least 1,001 spare storage extents in the redundancy group 56 (excluding any spares in the largest drive 60 itself). The reason why there must be at least 1,001 storage extents 62 rather than just 1,000 is because one spare extent will become assigned to an enhanced stripe 66 as part of the method 200, so there must be at least 1,000 remaining after that to fit all of the storage extents 62 of the largest drive 60 were it to fail and need to be rebuilt.

In some embodiments, in addition to ensuring that there is enough storage space in order to trigger enhancement, applying storage management policy 74 further includes applying another rule 76 that requires that availability of one or more system resources should exceed a minimum availability threshold (threshold $T_2$) in order for enhancement to be triggered. Thus, for example, triggering enhancement may require that processing resources exceed 70% (i.e., processing utilization should not exceed 30%). As another example, in order to trigger enhancement, the remaining available transfer capacity of the storage interface circuitry 38 should be at least 20% (thus, if the bus capacity is 10 Gbps, average bus usage should not exceed 8 Gbps).

In some embodiments, applying storage management policy 74 includes applying a rule 76 that requires that the available amount of storage space in a redundancy group 56 should be less than a threshold amount of space (threshold $T_3$) in order for retrogradation to be triggered. Threshold $T_3 < T_1$ by at least a buffer amount in order to prevent churning. Thus, for example, $T_1$ may be 2,000 storage extents 62 while $T_3$ is 1,300 storage extents 62. Similarly, in some embodiments, applying storage management policy 74 includes applying a rule 76 that requires that availability of one or more system resources should drop below an availability threshold (threshold $T_4$) in order for retrogradation to be triggered. Threshold $T_4 < T_2$ by at least a buffer amount in order to prevent churning. Thus, for example, $T_2$ may be 75% availability while $T_4$ is 60% availability.

In step 230, stripe update module 72 selects a particular unenhanced stripe 64 as a target for enhancement. In some embodiments, only metadata stripes 50 may be targets, while in other embodiments, data stripes 54 may also be targets. In one embodiment (not depicted), this selection is done randomly between all unenhanced stripes 64. In other embodiments, step 230 may include sub-step 232 and/or sub-step 234. In sub-step 232, the selection is based on the health of the drives 60 of the redundancy group 56. Thus, for example, the target unenhanced stripe 64 should include at least one storage extent 62 on the drive 60 that has the lowest health value of any of the storage drives 60 of the redundancy group 56. If there is more than one such unenhanced stripe 64 on that drive 60 (or none), then the drive 60 with the second-lowest health should be examined next, etc. Alternatively, the drive health may be averaged across the storage extents 62 of each stripe 64.

In sub-step 234, the selection is based on the workloads of the drives 60 of the redundancy group 56. Thus, for example, the unenhanced stripe 64 whose component storage extents' 62 source drives 60 have the lowest average workload should be selected as the target.

Then, in step 240, stripe update module 72 selects a storage extent 62 to be added to the target unenhanced stripe 64. This should be done according to whatever rules are generally used to select storage extents 62 for stripes 64, 66. For example, the spare storage extent 62 should come from a drive 60 which does not already include any other storage extent 62 belonging to the target unenhanced stripe.

Then, in step 250, stripe update module 72 updates the storage manager 44 to add the selected storage extent 62 to the target unenhanced stripe 64 to cause it to become an enhanced stripe 66. This may include making RAID configuration changes as well as copying data or generating and writing parity data. Thus, step 250 may include sub-step 252 or sub-step 254. In sub-step 252, target unenhanced stripe 64 is converted from a two-way mirror having two storage extents 62 to a three-way mirror having three storage extents 62 by copying data from one or both of the storage extents 62 of the two-way mirror onto the selected new storage extent 62. In sub-step 254, target unenhanced stripe 64 is enhanced by the addition of the selected storage extent 62 as a new parity extent to create an enhanced stripe 66 with more parity. Thus, for example, a RAID-5 unenhanced stripe 64 is converted into a RAID-6 enhanced stripe 66 or a RAID-6 unenhanced stripe 64 is converted into a RAID-7 enhanced stripe 66.

After step 250, operation may loop back to step 210.

In step 260, stripe update module 72 selects a particular enhanced stripe 66 as a target for retrogradation. This step may be done at random or it may be done inversely to step 230 (e.g., by picking a stripe 66 that is stored on drives 60 having poor health or high drive workloads). In some embodiments, only metadata stripes 50 may be targets, while in other embodiments, data stripes 54 may also be targets.

Then, in step 270, stripe update module 72 selects a storage extent 62 from the target enhanced stripe 66 to be removed. Step 270 typically includes one of sub-steps 272, 274. In sub-step 272, if the target enhanced stripe 66 is a mirrored stripe (e.g., a three-way mirror), then one of its constituent storage extents 62 is selected. In sub-step 274, if the target enhanced stripe 66 is a stripe that uses parity (e.g., RAID-6 or RAID-7), then one of its parity extents is selected.

Step 270 may also include one or both of sub-steps 276, 278. In sub-step 276, stripe update module 72 further selects based on drive health. In sub-step 278, stripe update module 72 further selects based on drive workload.

Finally, in step 280, stripe update module 72 updates the storage manager 44 to remove the selected storage extent 62 from the target enhanced stripe 66 to cause it to become an unenhanced stripe 64. This may include making RAID configuration changes to remove a storage extent 62. Thus, step 280 may include sub-step 282 or sub-step 284. In sub-step 282, target enhanced stripe 66 is converted from a three-way mirror having three storage extents 62 to a two-way mirror having two storage extents 62 by eliminating one of the storage extents 62 of the three-way mirror as selected in step 270. In sub-step 284, target enhanced stripe 66 is retrograded by the removal of the selected storage extent 62 (which is a parity extent) to create an unenhanced stripe 64 with less parity information. Thus, for example, a RAID-6 enhanced stripe 66 is converted into a RAID-5 unenhanced stripe 64 or a RAID-7 enhanced stripe 66 is converted into a RAID-6 unenhanced stripe 64.

After step 280, operation may loop back to step 210.

Thus, techniques have been presented for achieving higher levels of data protection for metadata 46 without compromising storage space available for storing user data 48. This result may be accomplished by dynamically adjusting levels of metadata redundancy to increase such levels as resource demands permit. For example, when available free storage exceeds a threshold $T_1$, additional metadata redundancy may be provided. In some embodiments, in addition to checking available free storage to decide whether to increase metadata redundancy, availability of other system resources may also be considered, such as processing utilization, system memory utilization, and storage bus utilization, for example. When system resources drop, metadata redundancy may be restored back to baseline values. In some embodiments, these techniques may be used to vary levels of redundancy used to protect user data 48 in addition to (or instead of) metadata 46.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of managing storage resources, the method comprising:
    storing metadata that points to user data in an array of storage extents on respective storage drives of a plurality of storage drives, the array of storage extents having a first level of redundancy, the first level of redundancy having a first number of storage extents on respective storage drives, the user data being stored on a different array of storage extents on respective storage drives of the plurality of storage drives; and
    in accordance with a storage management policy, adjusting the array of storage extents to have a second level of redundancy by changing the array of storage extents from having the first number of storage extents on respective storage drives to having a second number of storage extents on respective storage drives, the second level of redundancy providing a different tolerance for failure than the first level of redundancy.

2. The method of claim 1,
    wherein the first number is two and the first level of redundancy is two-way mirroring between a first storage extent and a second storage extent;
    wherein the second number is three and the second level of redundancy is three-way mirroring; and
    wherein adjusting the array of storage extents to have the second level of redundancy includes copying metadata from one of the first storage extent and the second storage extent to a third storage extent.

3. The method of claim 1,
    wherein the first number is three and the first level of redundancy is three-way mirroring; and
    wherein the second number is two and the second level of redundancy is two-way mirroring.

4. The method of claim 1 wherein the storage management policy includes a rule that at least one array should be enhanced by adding a storage extent only if the plurality of storage drives includes at least a threshold minimum amount of spare storage space.

5. The method of claim 4 wherein the threshold minimum amount of spare storage space is larger than a size of a largest storage drive of the plurality of storage drives.

6. The method of claim 4 wherein the storage management policy further includes a rule that at least one array should be enhanced by adding a storage extent only if an availability of system resources exceeds a threshold minimum resource availability.

7. The method of claim 6 wherein the storage management policy further includes a rule that at least one array should be retrograded if that array has already been enhanced and the availability of system resources falls below another threshold, the other threshold being less than the threshold minimum resource availability.

8. The method of claim 4 wherein the storage management policy further includes a rule that at least one array should be retrograded if that array has already been enhanced and the plurality of storage drives includes less than another threshold amount of spare storage space, the other hold amount of spare storage space being less than the threshold minimum amount of spare storage space.

9. The method of claim 4 wherein the method further comprises:
    storing additional metadata in a plurality of additional arrays of storage extents on respective storage drives of the plurality of storage drives, the array and the plurality of additional arrays forming a plurality of arrays; and
    in response to the storage management policy indicating that at least one array should be enhanced, selecting an array to be enhanced from the plurality of arrays based on the array having at least one storage extent on a drive having a drive health below a threshold minimum health value.

10. The method of claim 4 wherein the method further comprises:
    storing additional metadata in a plurality of additional arrays of storage extents on respective storage drives of the plurality of storage drives, the array and the plurality of additional arrays forming a plurality of arrays; and
    in response to the storage management policy indicating that at least one array should be enhanced, selecting an array to be enhanced from the plurality of arrays based on the storage drives providing the storage extents of the array having an average drive workload lower than any other array of the plurality of arrays.

11. A computer program product comprising a non-transitory computer-readable storage medium storing a set of instructions, which, when performed by a computing device, causes the computing device to manage storage resources by:
    storing data in an array of storage extents on respective storage drives of a plurality of storage drives, the array of storage extents having a first level of redundancy, the first level of redundancy having a first number of storage extents on respective storage drives; and
    in accordance with a storage management policy, adjusting the array of storage extents to have a second level of redundancy by changing the array of storage extents from having the first number of storage extents on respective storage drives to having a second number of storage extents on respective storage drives, the second level of redundancy providing a different tolerance for failure than the first level of redundancy, wherein the storage management policy includes a rule that at least one array should be enhanced by adding a storage extent only if the plurality of storage drives includes at least a threshold minimum amount of spare storage space.

12. The computer program product of claim 11 wherein the threshold minimum amount of spare storage space is larger than a size of a largest storage drive of the plurality of storage drives.

13. The computer program product of claim 11 wherein the storage management policy further includes a rule that at least one array should be enhanced by adding a storage extent only if an availability of system resources exceeds a threshold minimum resource availability.

14. The computer program product of claim 13 wherein the storage management policy further includes a rule that at least one array should be retrograded if that array has already been enhanced and the availability of system resources falls below another threshold, the other threshold being less than the threshold minimum resource availability.

15. The computer program product of claim 11 wherein the storage management policy further includes a rule that at least one array should be retrograded if that array has already been enhanced and the plurality of storage drives includes less than another threshold amount of spare storage space, the other hold amount of spare storage space being less than the threshold minimum amount of spare storage space.

16. A method of managing storage resources, the method comprising:

storing data in an array of storage extents on respective storage drives of a plurality of storage drives, the array of storage extents having a first level of redundancy, wherein the first level of redundancy includes a set of storage extents that exclusively stores non-parity information and a first storage extent outside the set that exclusively stores first parity information about the set of storage extents; and in accordance with a storage management policy, adjusting the array of storage extents to have a second level of redundancy by changing the array of storage extents to add a second storage extent outside the set that exclusively stores second parity information about the set of storage extents in addition to the first storage extent, the second parity information being different than the first parity information.

17. A method of managing storage resources, the method comprising:

storing data in an array of storage extents on respective storage drives of a plurality of storage drives, the array of storage extents having a first level of redundancy, wherein the first level of redundancy includes a set of storage extents that exclusively stores non-parity information and two storage extents outside the set that exclusively store parity information about the set of storage extents; and in accordance with a storage management policy, adjusting the array of storage extents to have a second level of redundancy by changing the array of storage extents to remove one of the two storage extents that exclusively store parity information about the set of storage extents.

* * * * *